(12) United States Patent
Papendieck et al.

(10) Patent No.: US 7,597,299 B2
(45) Date of Patent: Oct. 6, 2009

(54) CARRYING DEVICE

(75) Inventors: Stefan Papendieck, Sereetz (DE); Gunnar Wiegandt, Herrnburg (DE)

(73) Assignee: Dräger Medical AG & Co. KG, Lübeck (DE)

( * ) Notice: Subject to any disclaimer, the term of this patent is extended or adjusted under 35 U.S.C. 154(b) by 138 days.

(21) Appl. No.: 11/843,224

(22) Filed: Aug. 22, 2007

(65) Prior Publication Data

US 2008/0111039 A1    May 15, 2008

(30) Foreign Application Priority Data

Nov. 9, 2006    (DE)    ........................ 10 2006 052 803

(51) Int. Cl.
*F16M 11/06*    (2006.01)
(52) U.S. Cl. ............................. 248/281.11; 248/284.1; 248/325
(58) Field of Classification Search ............ 248/281.11, 248/585, 592, 564, 284.1, 325, 292.11, 584, 248/591, 631
See application file for complete search history.

(56) References Cited

U.S. PATENT DOCUMENTS

| 4,844,387 | A |   | 7/1989 | Sorgi et al. |
| 5,108,063 | A | * | 4/1992 | Koerber et al. ............ 248/284.1 |
| 5,799,917 | A | * | 9/1998 | Li ............................ 248/284.1 |
| 6,012,693 | A | * | 1/2000 | Voeller et al. .......... 248/280.11 |
| 7,059,574 | B2 | * | 6/2006 | Oddsen, Jr. ............ 248/280.11 |
| 7,097,145 | B2 | * | 8/2006 | Turner ................... 248/281.11 |
| 2008/0111042 | A1 | * | 5/2008 | Papendieck et al. ......... 248/325 |

FOREIGN PATENT DOCUMENTS

| DE |     100 24 110 C2 |   | 11/2001 |
| DE |    102004026117   |   |  7/2005 |
| DE |   102006014217 B3 | * |  5/2007 |
| EP |        271880 A2  | * |  6/1988 |
| EP |        508178 A1  | * | 10/1992 |

* cited by examiner

*Primary Examiner*—Anita M King
(74) *Attorney, Agent, or Firm*—McGlew and Tuttle, P.C.

(57) ABSTRACT

A height-adjustable carrying device with a parallelogram cranking mechanism has a self-locking pneumatic spring (6), with a valve for abolishing the blocking function. A release element (22), with which the valve (24) is actuated, is arranged according to the present invention at a handle (20) for swiveling the carrying device in one assembly unit.

6 Claims, 3 Drawing Sheets

_US 7,597,299 B2_

CARRYING DEVICE

CROSS REFERENCE TO RELATED APPLICATIONS

This application claims the benefit of priority under 35 U.S.C. § 119 of German Patent Application 10 2006 052 803.4 filed Nov. 9, 2006, the entire contents of which are incorporated herein by reference.

FIELD OF THE INVENTION

The present invention pertains to a carrying device with a height-adjustable bracket that has two bracket legs arranged between two end-side head pieces to form a parallelogram rocker, with a device mount at one of the head pieces and a handle in the area of the device mount for swiveling the bracket.

BACKGROUND OF THE INVENTION

A carrying device of the type is known from U.S. Pat. No. 4,844,387. Two bracket legs, which are connected to the head pieces in an articulated manner, are arranged between two end-side head pieces in the form of a parallelogram cranking mechanism. To compensate the weight of an object being carried, an opposing force means in the form of a pneumatic spring is provided, which ensures that the height of the object being carried can be set in a predetermined position with the parallelogram cranking mechanism. The pneumatic spring is self-locking and has a valve, with which the self-locking can be abolished. This valve can be actuated via a pushbutton arranged laterally on the bracket.

The prior-art carrying device is designed such that one of the head pieces is attached to a table or desk with a cranking mechanism, while a device mount for a monitor is provided at the other head piece. The monitor can be set to the desired working height with a handle on the front side of the device mount. By actuating the pushbutton on the bracket, the self-locking of the pneumatic spring is abolished before the height adjustment. Such brackets are also used in medical treatment rooms to mount monitoring devices. The monitoring device can be positioned at the eye level of the user in a simple manner by means of the freely swiveling parallelogram cranking mechanism.

The drawback of the prior-art carrying device is that two hands are needed for the adjustment, one of which swivels the device mount while the other actuates the pushbutton.

A height-adjustable bracket with a parallelogram cranking mechanism between two head pieces and with a self-locking pneumatic spring, in which spring the self-locking can be abolished with a hydraulic system, is known from DE 10 2004 026 117 B3. The hydraulic system has a hydraulic release element at the pneumatic spring, a release button and a hydraulic line between the hydraulic release element and the release button. The release button is arranged at a head piece of the bracket. However, if a device mount for a monitor is additionally arranged at the head piece, one-hand operation is not yet solved in a satisfactory manner.

SUMMARY OF THE INVENTION

The basic object of the present invention is to improve a carrying device of the type mentioned in terms of simple operation.

According to the invention, a carrying device is provided with a height-adjustable bracket which has bracket legs arranged between two end-side head pieces in the form of a parallelogram rocker. A self-locking pneumatic spring is provided with a valve for abolishing (switching off) the blocking function of the pneumatic spring. A device mount is provided at one of the head pieces and a handle is provided in an area of the device mount for swiveling the bracket. A release element is provided with a transmission means for actuating the valve. The release element is present in the area of the handle.

The release element may be a pushbutton. The release element may be a gripping element pivotable about a joint in the area of the handle. The gripping element may be arranged on the underside of the handle, pivotable towards the handle.

The transmission means may advantageously be a bowden cable. A rocker arm, which is actuated by the bowden cable, may be provided for releasing the valve in the area of the valve.

The advantage of the present invention can be seen in the fact that the release element for the valve of the pneumatic spring is arranged directly in the region and preferably directly at the handle assigned to the device mount, so that when the bracket is swiveled with the release element, which is connected to the handle in one assembly unit, the valve of the pneumatic spring is opened. The release element is connected for this purpose to the valve of the pneumatic spring via the transmission means. Besides a bowden cable, other electric or mechanical components may be used for transmitting the actuation of the release element to the valve of the pneumatic spring, as transmission means. The release element is advantageously a pushbutton, which is arranged directly at the handle.

It is especially advantageous to arrange a gripping element on the underside of the handle, which can be swiveled in the direction of the handle and which is used to release the valve of the pneumatic spring. The bowden cable may be a bowden cable, which is known from other fields of application, and with which the necessary forces can be transmitted between the release element and the valve. A rocker arm, which is actuated by the bowden cable and acts on the valve lifter, is advantageously provided for actuating the valve.

An exemplary embodiment of the present invention is shown in the figures and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
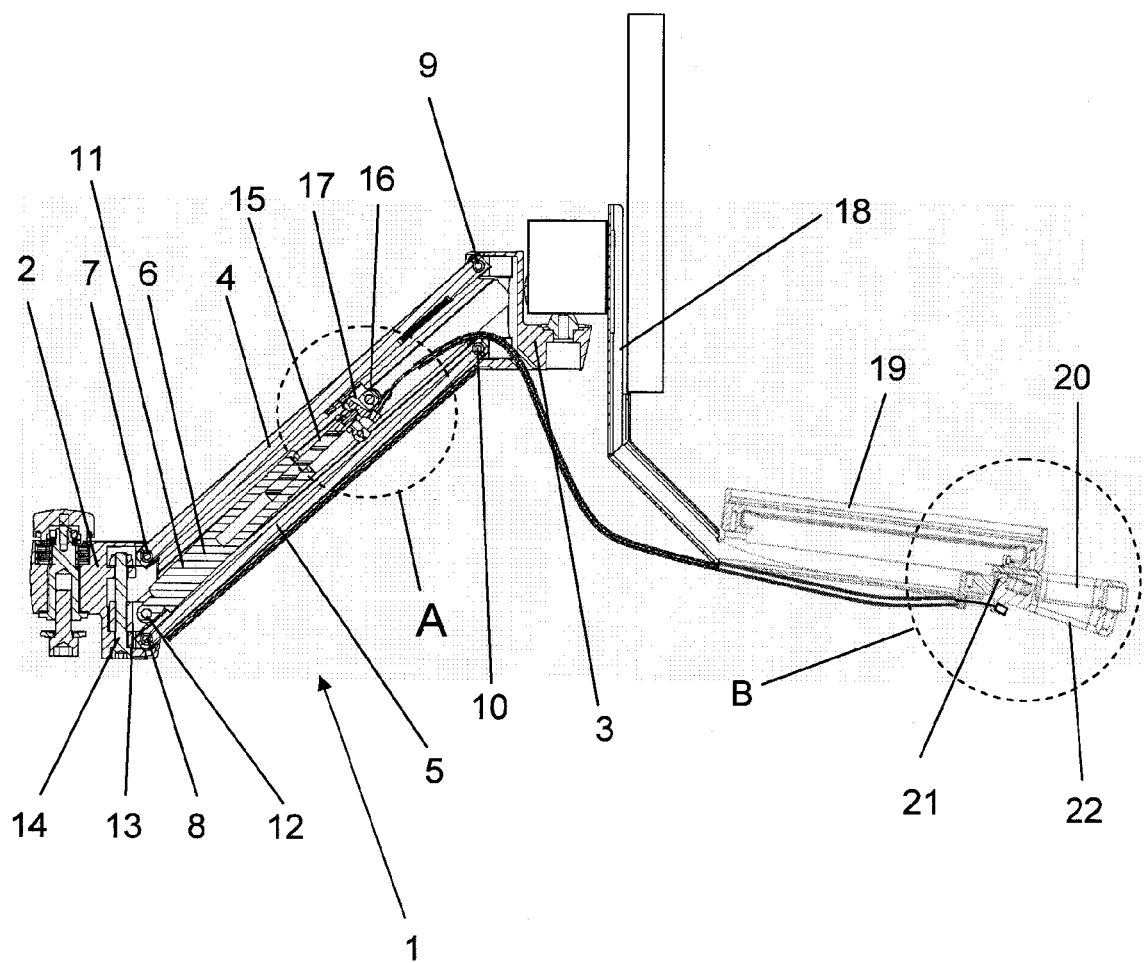
FIG. 1 is a longitudinal sectional view of a carrying device.

Referring to the drawings in particular, FIG. 1 schematically shows a longitudinal section of a bracket 1, which comprises a first head piece 2, a second head piece 3, a first bracket leg 4, a second bracket leg 5, and a pneumatic spring 6. The bracket legs 4, 5 are connected to the head pieces 2, 3 in the form of a parallelogram cranking mechanism via pin joints 7, 8, 9, 10. A piston sleeve 11 of the pneumatic spring 6 is attached via a pin joint 12 and a collet 13 to a threaded bolt 14 mounted within the first head piece 2. A lifting rod 15 of the pneumatic spring 6 is connected to the first bracket leg 4 via a pin joint 16 and a bearing block 17. The pneumatic spring 6 may be of the type disclosed in GB 2, 178, 508 A (which is incorporated by reference in its entirety) wherein the lifter 23 includes a valve 24 with a sealing cone and the spring arrangement presses the sealing cone on a valve seat of the valve 24. As the pneumatic spring 6 is a self locking pneumatic spring, an additional pull back spring between handle 20 and gripping element 22 is not required.

A holder 18 with a device mount 19 for a monitor, not shown in more detail, is arranged at the second head piece 3 by means of a ball and socket joint, not shown in more detail. A handle 20 is provided defining a hand grasping region with which the device mount 19 can be brought into the desired position. The handle 20 is located on the front side of the device mount. On its underside, the handle 20 has a gripping element 22, which can be swiveled against the handle 20 about a joint 21 to form a release element.

Figure 2:
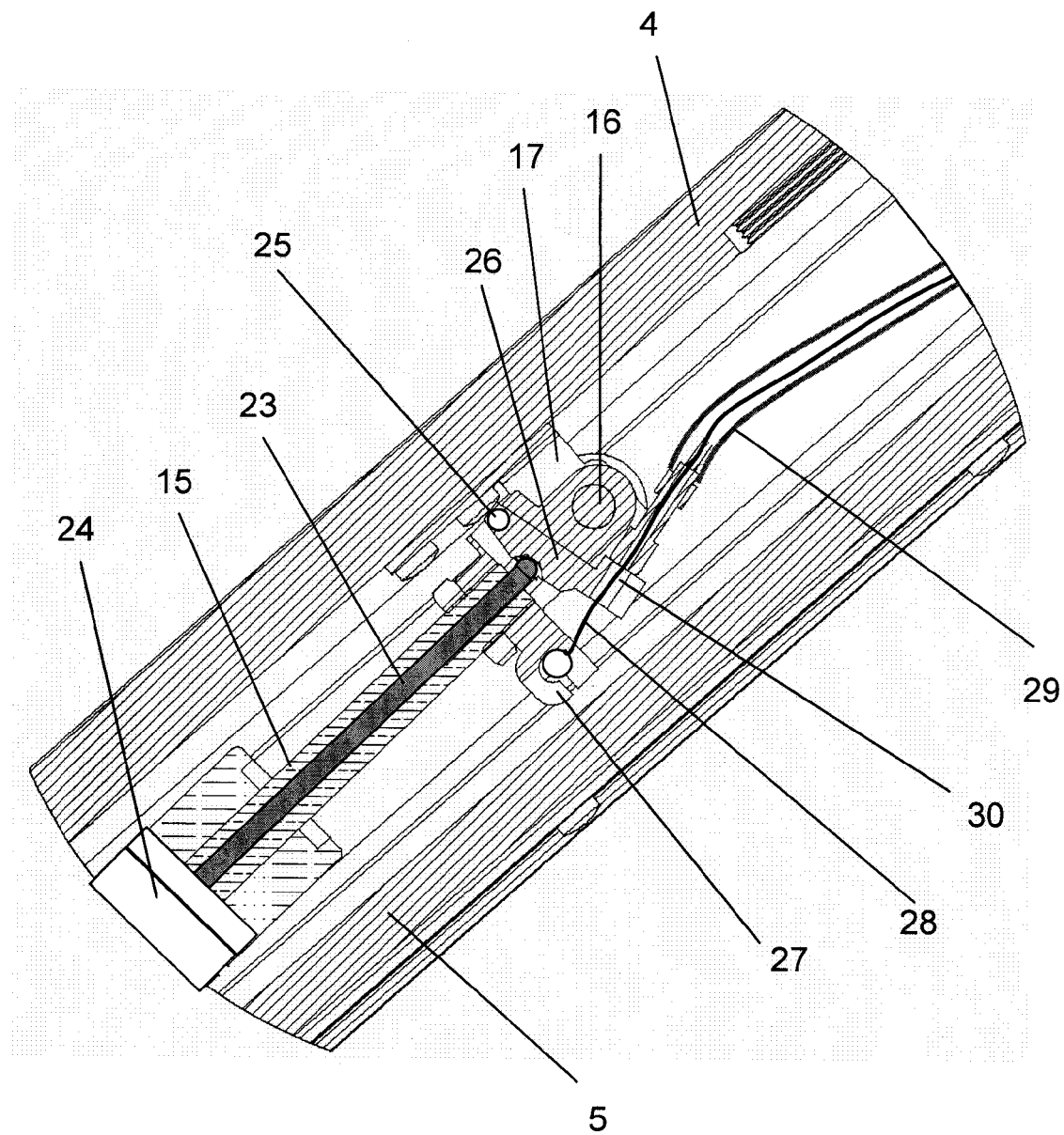
FIG. 2 is a detailed view A from FIG. 1 showing aspects of the carrying device according to FIG. 1.

FIG. 2 shows detail A according to FIG. 1. Identical components are designated by the same reference numbers as in FIG. 1.

A lifter 23, which actuates a valve 24 within the pneumatic spring 6, with which valve the self-locking of the pneumatic spring can be abolished, is guided within the lifting rod 15 in such a way that it can perform strokes.

In addition to the pin joint 16, a rocker arm 26, which can be swiveled about a hinge 25, is attached to the bearing block 17 for actuating the lifter 23. A mount 27 for arranging a steel cable 28 of a bowden cable 29, which is fixed in a mounting sleeve 30 at the lower end of the rocker arm 26, is located at the lifting rod 15. When the steel cable 28 is actuated, the rocker arm 26 is swiveled in the direction of the mount 27 and the valve 24 is thus opened via the lifter 23.

Figure 3:
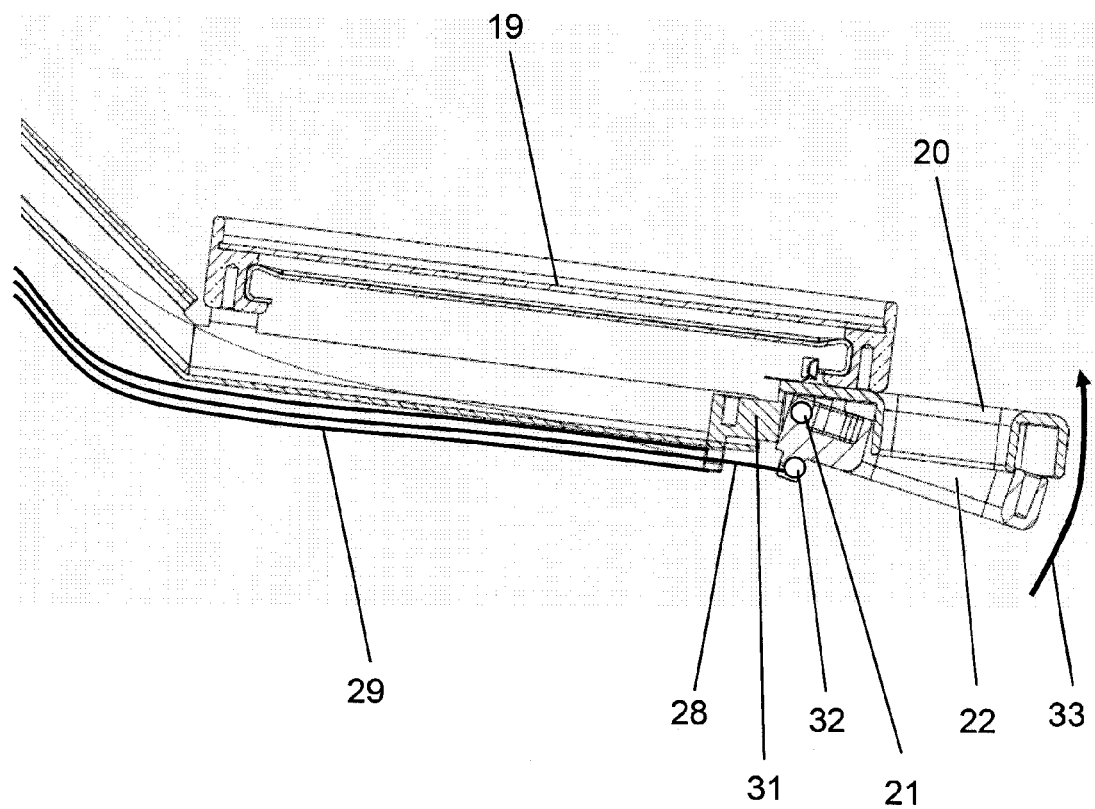
FIG. 3 is a detailed view B from FIG. 1 showing aspects of the carrying device according to FIG. 1.

FIG. 3 illustrates detail B according to FIG. 1. Identical components are provided with the same reference numbers as in FIGS. 1 and 2.

A mounting device 31 for the other end of the bowden cable 29 is located on the rear side of the handle 20. The steel cable 28 of the bowden cable 29, which steel cable is located inside, is hung into an eye 32 on the gripping element 22. When the gripping element 22 is swiveled along arrow 33 in the direction of the handle 20, the steel cable 28 is tensioned and the lifter 23 of the valve 24 is actuated with the rocker arm 26. The self-locking of the pneumatic spring 6 is thus abolished and the bracket can be swiveled into the predetermined working position with the handle 20. After releasing the handle 20, the gripping element 22 resumes the starting position and the valve 24, FIG. 2, is closed. The pneumatic spring now holds the bracket 1 in the working position set previously by means of the self-locking.

While specific embodiments of the invention have been shown and described in detail to illustrate the application of the principles of the invention, it will be understood that the invention may be embodied otherwise without departing from such principles.

What is claimed is:

1. A carrying device with a height-adjustable bracket, the carrying device comprising:
   bracket legs;
   a first end side head piece;
   a second end side head piece, said bracket legs being arranged between said first end-side head piece and said second end-side head piece and connected thereto to form a parallelogram rocker;
   a self-locking pneumatic spring with a valve for abolishing a blocking function of said self-locking pneumatic spring;
   a device mount at one of said head pieces;
   a handle in an area of said device mount, said handle for swiveling said bracket; and
   a release element with a transmission means for actuating said valve, said release element being in an area of said handle, said release element comprising a gripping element pivotable about a joint in said area of said handle, wherein said gripping element is arranged on an underside of said handle and is pivotable towards said handle.

2. A carrying device in accordance with claim 1, wherein said transmission means is a bowden cable.

3. A carrying device in accordance with claim 2, further comprising:
   a rocker arm connected to said valve for releasing said valve, said rocker arm being disposed in an area of said valve and being actuated by said bowden cable.

4. A carrying device with a height-adjustable bracket, the carrying device comprising:
   bracket legs;
   a first end side head piece;
   a second end side head piece, said bracket legs being arranged between said first end-side head piece and said second end-side head piece and connected thereto to form a parallelogram rocker;
   a self-locking pneumatic spring with a valve for abolishing a blocking function of said self-locking pneumatic spring;
   a device mount at one of said head pieces;
   a handle in an area of said device mount, said handle having a hand grasping region for swiveling said bracket; and
   a release element with a transmission means for actuating said valve, said release element being in a region for actuation with a hand grasping the hand grasping region, wherein said release element is a gripping element pivotable about a joint in said area of said handle and said release element is arranged on an underside of said handle and is pivotable towards said handle.

5. A carrying device in accordance with claim 4, wherein said transmission means is a bowden cable.

6. A carrying device in accordance with claim 5, further comprising:
   a rocker arm connected to said valve for releasing said valve, said rocker arm being disposed in an area of said valve and being actuated by said bowden cable.

* * * * *